United States Patent [19]

Locacius

[11] Patent Number: 4,535,999

[45] Date of Patent: Aug. 20, 1985

[54] GASKET ASSEMBLY HAVING A SEALING MEMBER SUSPENDED IN A CLEAR-THROUGH OPENING AND METHOD OF MAKING SAME

[75] Inventor: Robert F. Locacius, Lake Zurich, Ill.

[73] Assignee: Felt Products Mfg. Co., Skokie, Ill.

[21] Appl. No.: 633,449

[22] Filed: Jul. 23, 1984

[51] Int. Cl.³ .............................................. F16J 15/12
[52] U.S. Cl. ................................. 277/235 B; 277/166
[58] Field of Search .................. 277/166, 234, 235 R, 277/235 A, 235 B, 233, 236

[56] References Cited

U.S. PATENT DOCUMENTS 2,681,241  6/1954  Aukers ........................ 277/235 B X

FOREIGN PATENT DOCUMENTS

| 41906 | 12/1981 | European Pat. Off. ........ 277/235 B |
| 1948681 | 4/1971 | Fed. Rep. of Germany ... 277/235 B |
| 2714776 | 10/1978 | Fed. Rep. of Germany ... 277/235 B |
| 1260236 | 1/1972 | United Kingdom ............ 277/235 B |
| 1431183 | 4/1976 | United Kingdom ............ 277/235 B |
| 2092244 | 8/1982 | United Kingdom ............ 277/235 B |

*Primary Examiner*—Robert S. Ward
*Attorney, Agent, or Firm*—Dressler, Goldsmith, Shore, Sutker & Milnamow, Ltd.

[57] ABSTRACT

A head gasket assembly including a compressible sealing member, such as a grommet, and a method of assembling same. The sealing member is suspended in an opening in the main body of the head gasket as by tabs formed with the grommet and by eyelets which are disposed in openings in the main body and which eyelets have heel and overlap flanges which overlie and underlie the tabs. The eyelets are headed to provide the overlap portion during assembly of the components of the head gasket assembly. In a preferred form the grommet is suspended for vertical "floating" movement in the opening in the main body of the gasket.

18 Claims, 11 Drawing Figures

U.S. Patent   Aug. 20, 1985   Sheet 1 of 2   4,535,999
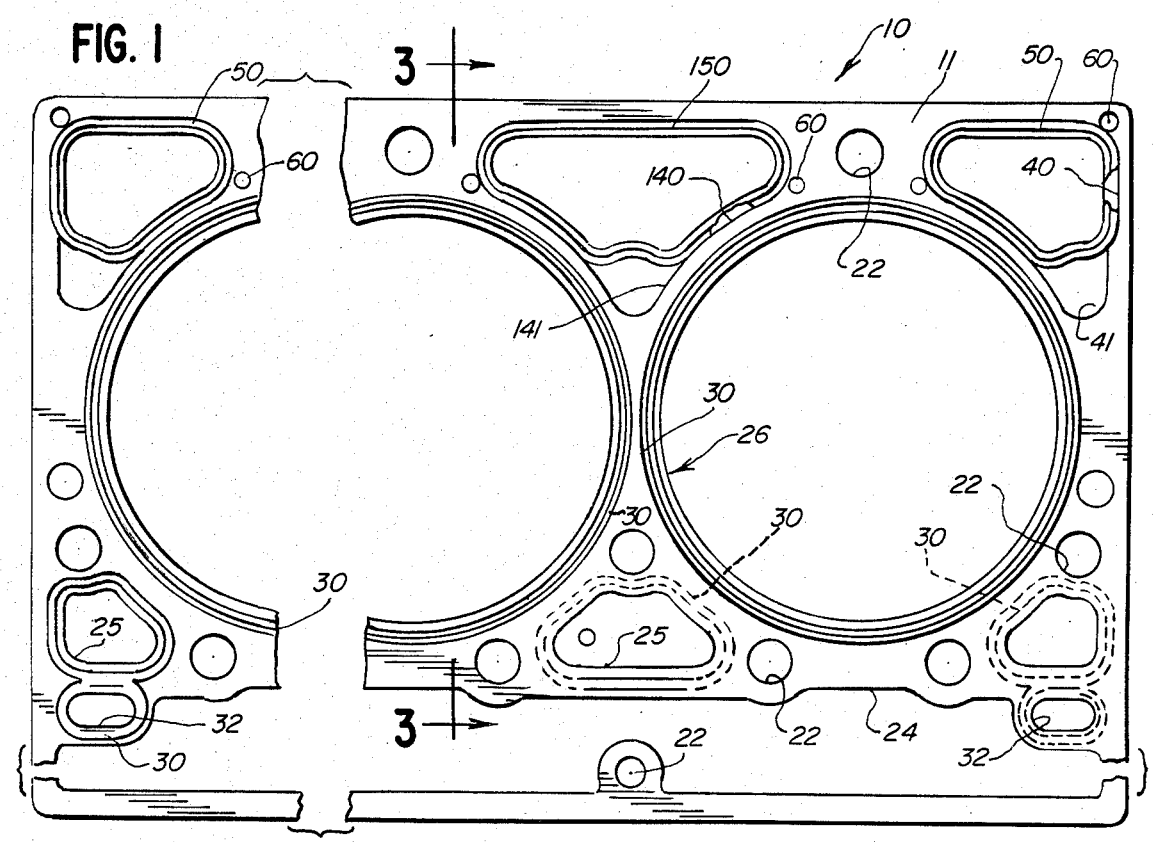
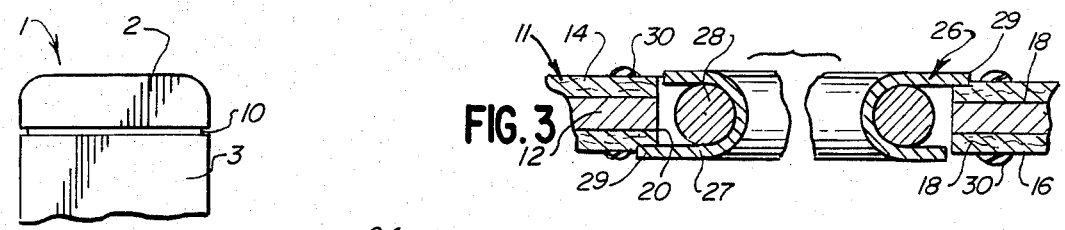
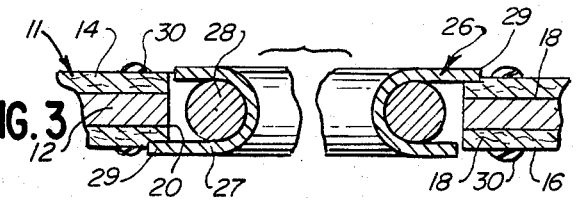
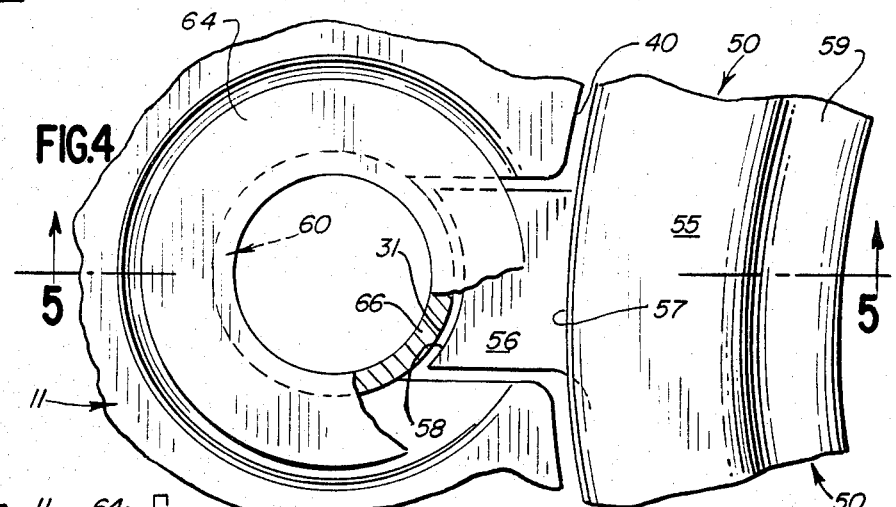
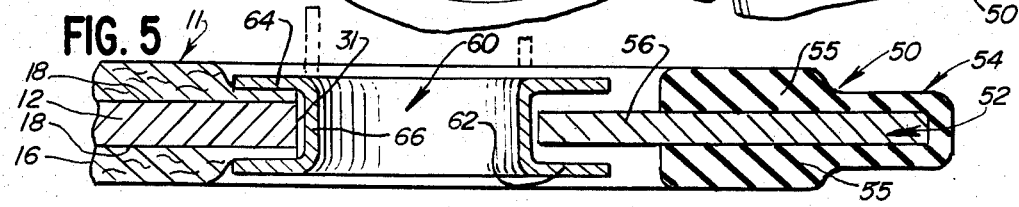

GASKET ASSEMBLY HAVING A SEALING MEMBER SUSPENDED IN A CLEAR-THROUGH OPENING AND METHOD OF MAKING SAME

BACKGROUND OF THE INVENTION

Gasket assemblies for use in sealing internal combustion engines are widely known and used. Many use auxiliary sealing elements, such as armoring and sealing members or grommets, which are separately formed and secured to the main body portion of the gasket assembly. The formation and securance of sealing members such as grommets which will not loosen or become disassembled in shipment and during installation has been difficult. A simple and effective method of securing such sealing members in gasket assemblies, such as laminated gasket assemblies, and a simple and effective sealing member for such a purpose would be of substantial advantage. A typical prior art mode of inserting and retaining a grommet, as with adhesive, is shown in U.S. Pat. No. 4,103,913.

SUMMARY OF THE INVENTION

The present invention comprises a gasket assembly, especially one which is adapted to be positioned between a pair of surfaces to be sealed, such as the head and the block of an internal combustion engine, and to be sealingly compressed therebetween. The gasket assembly includes an improved sealing member, such as a grommet, which is more easily assembled with the gasket assembly, and which remains assembled therewith in shipment and in use. In particular, the gasket assembly comprises a main gasket body having an expansive, flat central metallic core which may have a pair of compressible facing layers laminated to the core, one on each side of the core. The main gasket body defines a plurality of openings, which may include at least one combustion opening in the main gasket body and a fire ring disposed adjacent the edge of each combustion opening, at least one clear-through opening, such as a liquid opening, in the main gasket body for permitting the passage of fluid between the head and the block, a plurality of bolt openings, such as bolt holes, in the main gasket body, a compressible sealing member or grommet positioned in at least one clear-through opening, and suspending means secured to the main gasket body and having portions engaging spaced peripheral portions of the sealing member, thereby to suspend the sealing member in the opening.

In a preferred form, the sealing member or grommet comprises a metallic insert having upper and lower surfaces and compressible material on each of the upper and lower surfaces of the metallic insert. The compressible material is preferably molded elastomeric material. The insert desirably comprises at least a pair of spaced, outwardly projecting tabs which are integrally formed therewith. The suspending means comprises portions which overlie and underlie the tabs to suspend the grommet by the tabs in the opening.

In the most preferred form, the suspending means comprises a metallic eyelet which has heel and overlap flanges, and which overlies and underlies spaced portions of the grommet as well as spaced portions of the main gasket body, thereby to suspend the grommet in the liquid opening. Preferably, the grommet is floatingly supported for limited vertical movement in the opening, with the tabs positioned between the heel and overlap flanges to allow the grommet easily to assume its proper elevation when the gasket assembly is compressed between a head and block.

The method of making a gasket assembly in accordance with the present invention comprises the steps of providing a gasket having a main gasket body comprising an expansive, flat central metallic core. A pair of compressible facing layers may be laminated to the core, one on each side of the core. The main gasket body may define a plurality of openings including at least one combustion opening in the main gasket body, and having a fire ring disposed adjacent the edge of each combustion opening. A plurality of bolt openings in the main gasket body are provided and at least one clear-through opening is provided in the main gasket body. The method further comprises the steps of providing a compressible sealing member to be suspended in at least one clear-through opening, providing means for suspending the sealing member in the clear-through opening, and then suspending the sealing member in the clear-through opening by engaging spaced peripheral portions of the sealing member with the suspending means.

The sealing member may be a grommet and may comprise a metallic insert having upper and lower surfaces and compressible material on each of the upper and lower surfaces, and the main gasket body may define additional openings therein. The method may comprise the further steps of disposing the suspending means in the additional openings and deforming the suspending means to overlie and underlie the spaced peripheral portions of the grommet, thereby to support the grommet in the clear-through openings. When the insert is integrally formed with at least two outwardly projecting tabs, the deforming step comprises deforming the suspending means to overlie and underlie the tabs. The preferred suspending means comprises an eyelet, and in that event the deforming step comprises deforming a portion of the eyelet to form an overlap flange which overlies the main gasket body as well.

Other advantages, objects and features of the present invention will become apparent from the following detailed description of the invention and of a preferred embodiment thereof, from the claims, and from the accompanying drawings.

BRIEF DESCRIPTION OF THE DRAWINGS

FIG. 1 is a top plan view, partially broken away, of a gasket assembly incorporating the principles of the present invention.

FIG. 2 is a schematic side elevational view of an engine with which a gasket assembly of this invention is adapted to be used;

FIG. 3 is a cross-sectional view, partially broken away, taken substantially along line 3—3 of FIG. 1;

FIG. 4 is an enlarged fragmentary view of a portion of FIG. 1;

FIG. 5 is a cross-sectional view taken substantially along line 5—5 of FIG. 4;

FIG. 9 is an enlarged cross-sectional view taken substantially along line 9—9 of FIG. 7;

DETAILED DESCRIPTION

Figure 6:
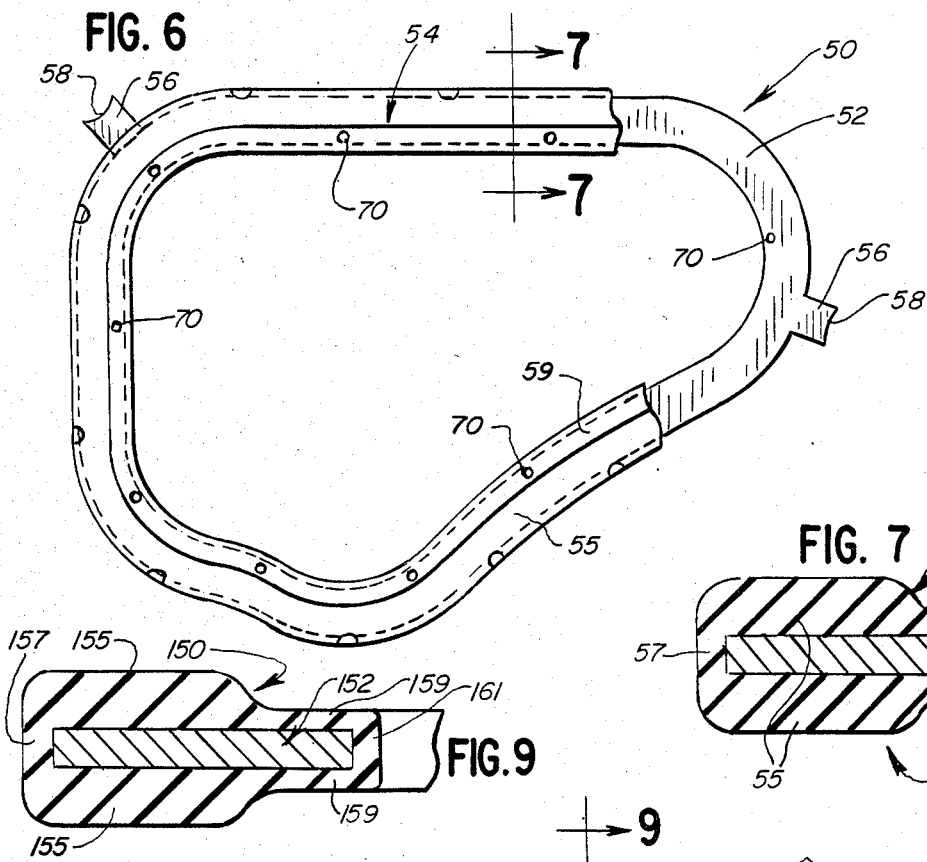
FIG. 6 is an enlarged plan view of a sealing member used in the construction of FIG. 1.
Figure 7:
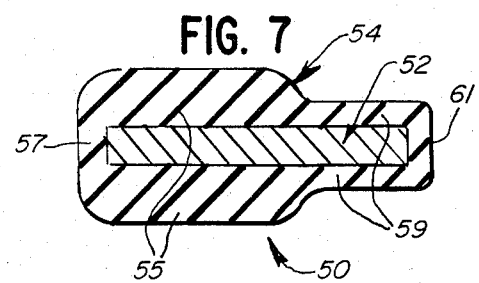
FIG. 7 is an enlarged cross-sectional view taken substantially alone line 7—7 of FIG. 6.

Referring now to the drawings, a presently preferred gasket assembly 10 of the present invention is adapted to be disposed between a pair of surfaces to be sealed, such as the head 2 and block 3 of an internal combustion engine 1, and to be compressed therebetween. Head 2 and block 3 include combustion cylinders, sleeves, pistons, oil and coolant passageways, bolt-holes, etc., all as is conventional, and in a configuration to which the basic configuration of the gasket assembly 10 has been designed. The details of the engine per se, which may be a diesel engine, form no part of the present invention, except that each gasket assembly 10 of the present invention will be configured as dictated by the particular engine with which it is to be used, and will be proportioned to accommodate to the openings and surfaces in the head and block with which the gasket assembly is to be used. A patent showing typical combustion openings, water and oil passages, bolt holes and the like is U.S. Pat. No. 3,565,449.

The gasket illustrated in FIG. 1 shows three of the six combustion openings for use in the engine 1 for which the gasket assembly 10 has been designed. Gasket assemblies made in accordance with this invention can be employed with an engine having fewer combustion cylinders. However, the invention will be illustrated and described by the six combustion opening gasket assembly 10.

Gasket assembly 10 comprises a main body portion 11 which may be a laminate, and is seen to comprise three gasketing layers laminated in conventional fashion to each other (FIGS. 3 and 5), including a generally flat, solid, central expansive metallic layer or core 12 and a pair of generally flat expansive compressible facing layers 14, 16. Core 12 comprises upper and lower flat, or planar faces, namely the surfaces to which facing layers 14, 16 are laminated. The main body portion 11 may also be coined, embossed, or may be otherwise surface modified, as by etching, in desired locations.

Facing layers 14, 16 are desirably formed of a composite, compressible gasket facing material and may be fiber reinforced. They are laminated mechanically or adhesively to the core surfaces 18, as by a suitable heat-activated adhesive. Suitable heat activatable adhesives include phenolic-nitrile rubber and polybutyral rubber which is desirably initially applied to the facing layer surfaces. The facing layers may incorporate asbestos, glass fibers, or other suitable fibrous materials, and may utilize nitrile, neoprene or polyacrylic elastomers as a binder. Frequently the binder comprises from about 10 to about 25% of the facing layer, whether asbestos fibers, or whether other organic or inorganic fibers, fillers or the like are used. In the embodiment illustrated, the facing layers 14, 16 have a thickness of about 0.015 inch, although, of course, this may vary with the application, and may range from about 0.010 to about 0.035 inch. Facing layers 14, 16 generally resist degradation by oils and coolants, retain torque, minimize extrusion, and exhibit heat resistance.

The main body portion 11 of gasket assembly 10 is die-cut or blanked out, such as with a stamping machine, punch press or other suitable form of equipment to provide a plurality of openings, such as combustion openings 20, and apertures, such as bolt openings 22, and a plurality of fluid flow oil and water passageways. The core may be of cold rolled steel and its thickness may vary with the particular application. Core thicknesses of from about 0.015 inch to about 0.040 inch are typical. In the embodiment illustrated, the thickness of the core is about 0.030 inch. To enhance adherance, the core surfaces may be phosphatized in a conventional manner, or may be otherwise surface treated to improve adhesion.

The main body portion 11 may then be provided with a suitable fire ring or armor 26 secured in a known manner to seal the combustion openings. The annular armoring 27 may be stainless steel of about 0.008 inch in thickness which may embrace a wire ring, such as steel ring 28. Desireably, the armor 26 may float, i.e., may be suspended adjacent the edges of the combustion openings by tabs 29 as in the manner described in U.S. Pat. No. 3,565,449. Alternatively, as desired, the armor may fully or partially overlap the combustion openings 20.

In the embodiment shown, a desired sealing pattern may be disposed on and secured to one or both surfaces of the main body portion in selected zones. The sealing pattern may comprise a series of sealing beads, such as beads 30, applied to those zones in which increased or augmented sealing forces or supplemental seals are required or desired in the application for which the gasket assembly 10 is to be used. Typically beads 30 are formed substantially to surround selected water and oil passages between the associated head and block. Beads 30 may also be applied elsewhere, as around the armoring. At times, because of the configuration of the head and block, and the location of the bolt holes, or for other design reasons, less than a circular or completely encircling bead configuration may be desireable and used.

In the embodiment illustrated, the sealing beads 30 may be formed of a silicone sealant which is preferably deposited by a silk-screening process, typically as described in U.S. Pat. No. 3,477,867, and with a height at the high point of the bead of from about 0.004 to about 0.010 inch. The silicone may be a two-component, heat curable liquid silicone. The sealing beads are precisely, accurately and consistently located from gasket to gasket.

If desired, the facing surfaces to which the beads are applied may be post-treated with an anti-stick or coating, such as a suitable polytetrafluorethylene (Teflon) layer or other anti-stick, or anti-fretting layer, such as of the type described in U.S. Pat. No. 4,103,913.

As may be seen from FIG. 1, a plurality of openings are provided for various purposes. In addition to the combustion openings 20, and bolt holes 22, elongate push rod opening 24, coolant openings 25, and high pressure oil openings 32, clear-through liquid (water, coolant) openings 40, 140 are provided in the main gasket body. The openings 40, 140 are provided with sealing members such as grommets, as will be described, but may leave portions which are outside of the periphery of the grommets. Those portions 41, 141 are disposed outwardly of the complementary flow channels in the head and block and are aligned with bolt holes in the head and block. Accordingly, opening portions 41, 141 also serve as bolt holes or openings.

In prior art gaskets of the type with which this invention is concerned, clear through openings such as coolant or water (liquid) openings 40, 140 have been provided in the main bodies of gasket assemblies, and compressible sealing grommets have been inserted in the openings. Such grommets have been glued in place or have been frictionally held in place. To maintain the grommets in their desired positions has been difficult during shipment and during assembly with an engine, and to position them appropriately, as at the appropriate relative elevations, has likewise been difficult.

The grommets disclosed herein are compressible and are specially configured and are positively held in their desired positions in the liquid openings in which they are disposed. In the preferred form they are held in a "floating" relationship which enables them to move freely vertically within limits so that they may self-center themselves, i.e., may assume their proper elevations relative to the main body portion 11 when installed.

Referring now to grommet 50 which is flat and which is floatingly suspended and disposed in a suitably configured opening such as coolant opening 40 in the main body portion 11, grommet 50 is seen to comprise a steel insert 52 having upper and lower surfaces, and on which a molded elastomeric element has been formed and to which it is adhered. Rubber element 54 is seen to surround and embed the insert 52, except in the zones of tabs 56. The rubber element 54 provides legs 55 which overlie the upper and underlie the lower surfaces of the insert, a rear face 57 which encapsulates one of the edges of the insert, and a U-shaped portion having thinner legs 59 and an inner face 61. The legs 55 are the portions of the rubber element which will seal the surrounded opening through which coolant fluid passes between a head and block when they are juxtaposed in sealing relationship with the gasket assembly 10 of this invention.

As shown, grommet assembly 50 includes at least two spaced, outwardly projecting peripheral tabs 56 integrally formed with the insert. Tabs 56 define concave ends, such as ends 58 which are arcuate in configuration. Tabs 56 are positioned so that when they are located in the manner to be described, they will floatingly support and secure the grommet 50 in its associated opening.

To that end, as best seen in FIGS. 4 and 5, the end portions of tabs 56 are disposed between portions of a suspending means, such as between the overlap (or head) and heel (or base) flanges or portions of an eyelet, or rivet 60. In assembling gasket assembly 10, rivets, such as the unheaded rivet shown in dotted line in FIG. 5, are positioned in suitably formed openings 31 in the main body portion 11 closely adjacent the openings in which grommets 50 are to be positioned. After a grommet is positioned with its tabs 56 supported on the base 62 of the rivet, the upper end of the rivet is peaned over to form a head 64. Tab 56 is thereby floatingly "captured" between the underlying base 62 and overlying head 64. The concave end 58 is disposed closely adjacent the shank 66 of the rivet, preferably with some space provided between the tab 56 and the base 62 and head 64 to permit the grommet to move vertically (within limits) to self-center the grommet and to properly position the grommet relative to the overall gasket assembly when the gasket assembly is compressed between a head and block.

As shown by FIG. 5, when the rivets 60 are formed to provide the heads 64, they are also deformed and the facings are compressed sufficiently so that the heads 64 and bases 62 are recessed slightly inwardly of the surfaces of the facings 14, 16 which they overlie and underlie, respectively. As such, the rivets will not interfere with the sealing characteristics of the gasket assembly 10 and will not take up any of the available compression load when the gasket is compressed between a head and block.

Figure 8:
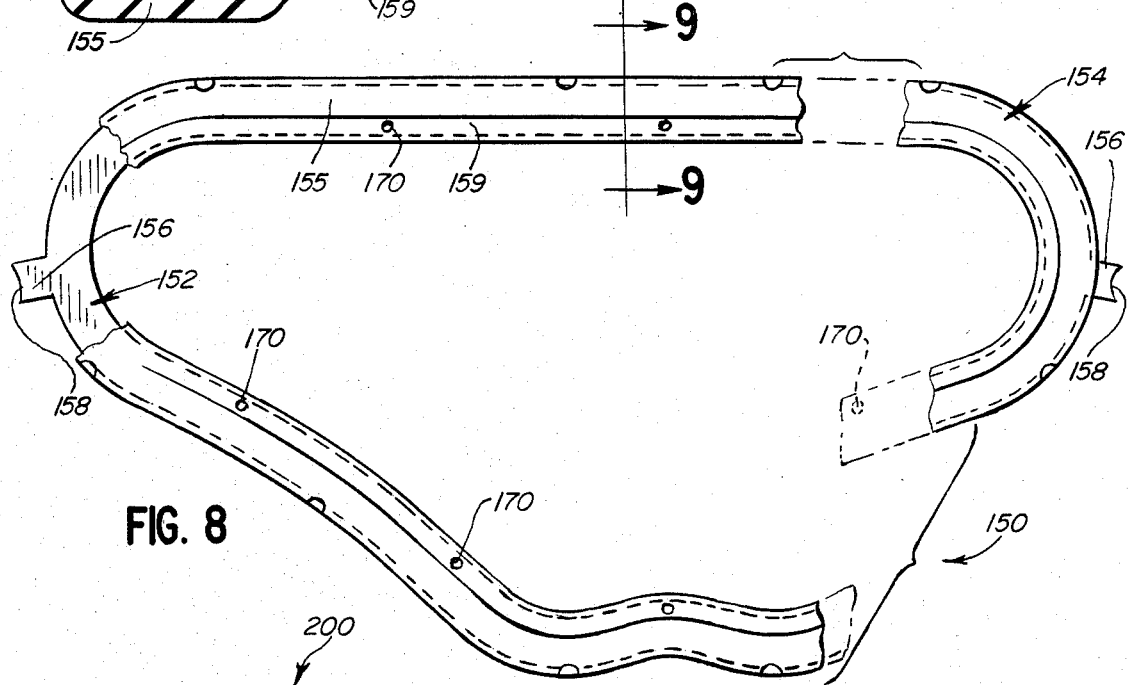
FIG. 8 is an enlarged plan view, partially broken away, of another sealing member used in the construction of FIG. 1.

The flat grommet 150 of FIGS. 8 and 9 is quite similar to the grommet of FIGS. 4–7. Thus, grommet 150 comprises a steel insert 152 on which a molded rubber element has been formed and adhered. Rubber element 154 surrounds and embeds the insert 152, except in the zones of tabs 156. The element 154 provides legs 155 which overlie the upper and lower surfaces of the insert, a rear face 157 which encapsulates one of the edges of the insert, and a U-shaped portion having thinner legs 159 and an inner face 161. The legs 155 are the portions which seal the surrounded opening 140 through which coolant fluid passes.

Grommet assembly 150 includes a pair of outwardly projecting peripheral tabs 156. Tabs 156 define concave, arcuate ends 158. Tabs 156 are positioned so that when they are gripped in the manner described, they floatingly support, secure and suspend the grommet 150 in its associated opening 140.

Like the grommet 50, the ends of tabs 156 are disposed between overlap and heel portions of an eyelet, such as the rivet 60. In assemblying gasket assembly 10, rivets for the grommet 150 are positioned in suitably formed and positioned openings in the main body portion 11 closely adjacent openings 140. After a grommet is positioned with its tabs supported on the base of the rivet, the upper end of the rivet is peaned over to form a head. Tab 156 is thereby floatingly "captured" between the base and head. The concave end 158 is disposed closely adjacent the shank of the rivet, with some space provided between the tab 156 and the base and head to permit the grommet to move vertically (within limits) to self-center the grommet and to properly position the grommet relative to the overall gasket assembly when the gasket assembly is sealingly disposed between a head and block.

When the eyelets or rivets mounting grommet 150 are formed to provide the heads, they are also deformed or compressed sufficiently, or the main gasket body is deformed sufficiently as by indenting the main body portion, so that the heads and bases are recessed slightly inwardly of the surfaces of the facings 14, 16. Thus, the rivets will not interfere with the sealing characteristics of the gasket assembly.

The grommets 50 and 150 have a metal core or insert which is about 0.020 inch thick. The molded rubber legs 55 and 155 are each about 0.025 inch in thickness. In the zones of the U-shaped portions, the rubber leg thickness is about 0.015 inch. A plurality of holes 70, 170 of about 1/32 inch in diameter are spaced along the internal periphery of the inserts to facilitate supporting of the insert in the mold in which the rubber is molded to the insert. A preferred elastomer is a terpolymer of ethylene, propylene. In the preferred form, the grommets 50, 150 are proportioned so that they will compress approximately 15 to 30 percent of the effective rubber thickness. This will produce an effective seal, without taking up excessive amounts of the available torquing force.

The grommets 50 and 150 have been described as being positioned closely adjacent the openings 40 and 140 in the main gasket body 11 so that tabs 56 and 156 may reach outwardly towards the openings in which the rivets 60 are disposed. Although the rivets may be headed after preliminary assembly of the unformed rivet, grommet and main gasket body, it is clear that two piece rivets or other fastening means may be used which will provide elements to overlie and underlie the tabs to embrace and capture the tabs and, where desired, to provide for floating support of the grommets. Other suspension means which provide portions which overlie and underlie the main gasket body and which also support peripheral portions of the grommet in the openings 40, 140 may also be used.

Figure 10:
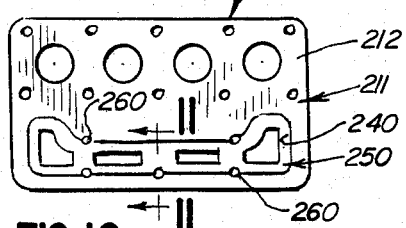
FIG. 10 illustrates a further embodiment employing the principles of the present invention.
Figure 11:
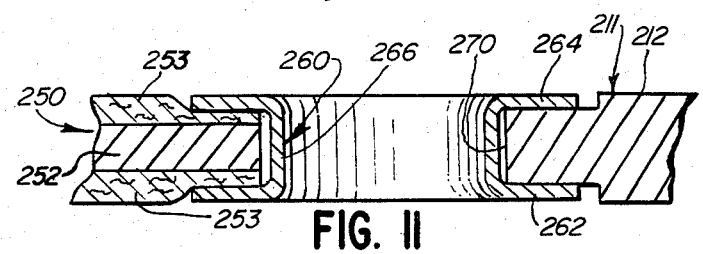
FIG. 11 is a cross-sectional view taken substantially along line 11—11 of FIG. 10.

As illustrated by FIGS. 10 and 11, it will be apparent that compressible grommets or other inserted sealing members may utilize compressible layers of the same types of material of which the facings of the main gasket body is formed. The embodiment of FIGS. 10 and 11 comprises a gasket assembly 200 having a main body portion 211. The central core 212 is metallic and there are no facing layers used. Combustion openings and other of the openings described in connection with the embodiment of FIGS. 1–9 appear as well.

As best seen in FIG. 11, a sealing member 250 comprises a steel insert 252 and compressible layer 253 on each surface of the insert. The compressible material may be substantially the same as the facing layers 14, 16. It will be apparent that the sealing member 250 may define more than one opening.

The sealing member 250 is supported by a suspension means, such as a plurality of eyelets 260, each having a base 262, a head 264 and a shank 266. The central core 212 is recessed or coined adjacent the opening 270 so that the base 262 and head 264 are effectively recessed below the upper and lower surfaces of the core. As such, the eyelets will not interfere with the sealing characteristics of the central core 212. Also, as shown by FIG. 11, when the eyelet 260 is formed to assume the shape illustrated, the eyelet compresses the compressible layers 254 so that the base 262 and head 264 do not interfere with the sealing characteristics of sealing member 250.

As seen in FIGS. 10 and 11, the head and base of the eyelet 260 overlie and underlie adjacent portions of the main gasket body 211 as well as peripheral portions of the sealing member 250, thereby to suspend and support the sealing member 250 in the opening 270. It will be apparent that opening 270 is circular and is partially disposed in each of body portion 211 and sealing member 250. Thus, for example, each may define complementary semi-circular configurations in plan view.

It will be apparent from the foregoing that further embodiments of this invention may be made without departing from the spirit and scope of the invention. Accordingly, the scope of the invention is to be considered as being limit only insofar as may be made necessary by the claims.

What is claimed is:

1. A gasket assembly adapted to be positioned between a pair of surfaces to be sealed and to be compressed therebetween, said gasket assembly comprising:
a main gasket body comprising an expansive, flat central core, said main gasket body defining a plurality of openings, including a plurality of bolt openings in said main gasket body,
a compressible sealing member positioned in at least one opening to be sealed, said sealing member comprising an insert having upper and lower surfaces and compressible material on each of said upper and lower surfaces of said
and at least two suspending members secured to said main gasket body and each member having portions spaced overlying and underlying peripheral portions of said sealing member, said suspending members each having second portions overlying and underlying said main body portion adjacent said opening to be sealed, thereby to suspend said sealing member in said opening to be sealed.

2. A gasket assembly adapted to be positioned between a pair of surfaces to be sealed and to be compressed therebetween, said gasket assembly comprising:
a main gasket body comprising an expansive, flat central metallic core, said main gasket body defining a plurality of openings, including a plurality of bolt openings in said main gasket body,
a compressible sealing member positioned in at least one opening to be sealed, said sealing member comprising a metallic insert having upper and lower surfaces and compressible material on each of said upper and lower surfaces of said metallic insert, and
suspending means secured to said main gasket body and having portions engaging spaced peripheral portions of said sealing member, thereby to suspend said sealing member in said opening to be sealed, and wherein said insert comprises at least a pair of spaced, outwardly projecting tabs which are integrally formed with said insert, and wherein said suspending means portions engaging peripheral portions of said sealing member comprise portions overlying and underlying said tabs, said portions confronting and being spaced from said tabs so that said sealing member may float vertically.

3. A gasket assembly in accordance with claim 2, and wherein said suspending means comprises metallic eyelets defining heel and overlap flanges, said heel and overlap flanges comprising said overlying and underlying portions.

4. A gasket assembly adapted to be positioned between a pair of surfaces to be sealed and to be compressed therebetween, said gasket assembly comprising:
a main gasket body comprising an expansive, flat central metallic core, said main gasket body defining a plurality of openings, including a plurality of bolt openings in said main gasket body,
a compressible sealing member positioned in at least one opening to be sealed, and
suspending means secured to said main gasket body and having portions engaging spaced peripheral portions of said sealing member, thereby to suspend said sealing member in said opening to be sealed, and wherein said suspending means comprises eyelets defining heel and overlap flanges engaging said spaced peripheral portions of said sealing member.

5. A gasket assembly in accordance with claim 4, and wherein said heel and overlap flanges overlie and underlie said main gasket body, thereby to suspend said sealing member in said opening to be sealed.

6. A gasket assembly in accordance with claim 1 and wherein said gasket is a head gasket defining at least one combustion opening, said compressible material is molded elastomeric material formed on said insert, said sealing member surrounds a liquid opening to be sealed, and said gasket assembly further comprises an elastomeric sealing bead surrounding at least one of said plurality of openings, and wherein said insert defines integral spaced tabs projecting outwardly from said periphery and said suspending members first portions overlie and underlie said tabs to permit said sealing member to float vertically in said opening to be sealed.

7. A gasket assembly in accordance with claim 6, and wherein said central core is a metallic core and said insert is metallic.

8. A gasket assembly adapted to be positioned between a head and a block of an internal combustion engine and to be compressed therebetween, said gasket assembly comprising:
   a main gasket body comprising an expansive, flat central metallic core, said main gasket body defining a plurality of openings,
   at least one combustion opening in said main gasket body,
   a fire ring disposed adjacent the edge of each combustion opening,
   at least one clear-through liquid opening in said main gasket body for permitting the passage of liquid between a head and a block,
   a plurality of bolt hole openings in said main gasket body,
   a compressible grommet positioned in at least one liquid opening, said grommet comprising a metallic insert having upper and lower surfaces and compressible material on each of said upper and lower surfaces of said metallic insert, and
   suspending means secured to said main gasket body and having portions engaging spaced peripheral portions of said grommet, thereby to suspend said grommet in said liquid opening, and wherein said insert comprises at least a pair of spaced, outwardly projecting tabs which are integrally formed with said insert, and wherein said suspending means portions engaging peripheral portions of said grommet comprise portions overlying and underlying said tabs, said portions confronting and being spaced from said tabs so that said grommet may float vertically in said liquid opening.

9. A gasket assembly in accordance with claim 8, and wherein said suspending means comprises metallic eyelets defining heel and overlap flanges, said heel and overlap flanges comprising said overlying and underlying portions.

10. A gasket assembly adapted to be positioned between a head and a block of an internal combustion engine and to be compressed therebetween, said gasket assembly comprising:
    a main gasket body comprising an expansive, flat central metallic core, said main gasket body defining a plurality of openings,
    at least one combustion opening in said main gasket body,
    a fire ring disposed adjacent the edge of each combustion opening,
    at least one clear-through liquid opening in said main gasket body for permitting the passage of liquid between a head and a block,
    a plurality of bolt hole openings in said main gasket body,
    a compressible grommet positioned in at least one liquid opening, and
    suspending means secured to said main gasket body and having portions engaging spaced peripheral portions of said grommet, thereby to suspend said grommet in said liquid opening, and wherein said suspending means comprises eyelets defining heel and overlap flanges engaging said spaced peripheral portions of said grommet.

11. A gasket assembly in accordance with claim 10, and wherein said heel and overlap flanges overlie and underlie said main gasket body, thereby to suspend said grommet in said liquid opening.

12. A gasket assembly adapted to be positioned between a head and a block of an internal combustion engine and to be compressed therebetween, said gasket assembly comprising:
    a main gasket body comprising an expansive, flat central metallic core, said main gasket body defining a plurality of openings,
    at least one combustion opening in said main gasket body,
    a fire ring disposed adjacent the edge of each combustion opening,
    at least one clear-through liquid opening in said main gasket body for permitting the passage of liquid between a head and a block,
    a plurality of bolt hole openings in said main gasket body,
    a compressible grommet positioned in at least one liquid opening, and
    suspending means secured to said main gasket body and having portions engaging spaced peripheral portions of said grommet, thereby to suspend said grommet in said liquid opening, and wherein said main gasket body comprises a pair of compressible facing layers laminated to said core, one on each side of said core, wherein said grommet comprises a metallic insert having upper and lower surfaces and compressible material on each of said upper and lower surfaces of said metallic insert, and wherein said suspending means portions comprises eyelets having flanges overlying and underlying said grommet and said main body portion to suspend said grommet in said liquid opening.

13. A gasket assembly in accordance with claim 12, and wherein said grommet comprises a metallic insert having upper and lower surfaces and compressible material on each of said upper and lower surfaces of said insert.

14. A gasket assembly in accordance with claim 13 and wherein said insert comprises at least a pair of spaced, outwardly projecting tabs which are integrally formed with said insert, and wherein said suspending means portions engaging peripheral portions of said grommet comprise portions overlying and underlying said tabs, said portions confronting and being spaced from said tabs so that said grommet may float vertically.

15. The method of making a gasket assembly adapted to be positioned between a head and a block of an internal combustion engine and to be compressed therebetween, comprising the steps of
    providing a gasket having a main gasket body comprising an expansive, flat central metallic core, said main gasket body defining a plurality of openings including at least one combustion opening in said main gasket body, a plurality of bolt openings in said main gasket body, and at least one clear-through opening in said main gasket body,
    providing a generally flat compressible sealing member to be suspended in at least one clear-through opening,
    providing means for suspending said sealing member in said clear-through opening and for securing said suspending means to said main body portion, and
    suspending said sealing member in said clear-through opening by securing spaced peripheral portions of said sealing member with said suspending means to said main body portion, said sealing member comprising a metallic insert having upper and lower surfaces and compressible material on each of said upper and lower surfaces, and wherein said main gasket body defining additional openings, and comprising the further steps of securing said suspending means in said additional openings and deforming said suspending means to overlie and underlie said spaced peripheral portions, thereby to support said sealing member in said clear-through opening, and wherein said sealing member is formed with at least two outwardly projecting tabs, and wherein said deforming step comprises deforming said suspending means to overlie and underlie said tabs.

16. The method of making a gasket assembly adapted to be positioned between a head and a block of an internal combustion engine and to be compressed therebetween, comprising the steps of providing a gasket having a main gasket body comprising an expansive, flat central metallic core, said main gasket body defining a plurality of openings including at least one combustion opening in said main gasket body, a plurality of bolt openings in said main gasket body, and at least one clear-through opening in said main gasket body, providing a generally flat compressible sealing member to be suspended in at least one clear-through opening, providing means for suspending said sealing member in said clear-through opening and for securing said suspending means to said main body portion, and suspending said sealing member in said clear-through opening by securing spaced peripheral portions of said sealing member with said suspending means to said main body portion, said sealing member comprising a metallic insert having upper and lower surfaces and compressible material on each of said upper and lower surfaces, and wherein said main gasket body defining additional openings, and comprising the further steps of securing said suspending means in said additional openings and deforming said suspending means to overlie and underlie said spaced peripheral portions, thereby to support said sealing member in said clear-through opening, and wherein said suspending means comprises an eyelet, and said deforming step comprises deforming a portion of said eyelet to form an overlap flange.

17. The method of making a gasket assembly adapted to be positioned between a head and a block of an internal combustion engine and to be compressed therebetween, comprising the steps of providing a gasket having a main gasket body comprising an expansive, flat central core, said main gasket body defining a plurality of openings including at least one combustion opening in said main gasket body, a plurality of bolt openings in said main gasket body, and at least one clear-through opening in said main gasket body, providing a generally flat compressible sealing member to be suspended in at least one clear-through opening, providing means for suspending said sealing member in said clear-through opening and for securing said suspending means to said main body portion, and suspending said sealing member in said clear-through opening by securing spaced peripheral portions of said sealing member with said suspending means to said main body portion, said sealing member comprising an insert having upper and lower surfaces and compressible material on each of said upper and lower surfaces, and wherein said main gasket body defining additional openings, and comprising the further steps of securing said suspending means in said additional openings and deforming said suspending means to overlie and underlie said spaced peripheral portions, thereby to support said sealing member in said clear-through opening, and wherein the deforming step comprises deforming a portion of said suspending means to overlie and underlie said main body portion adjacent said additional openings as well as at said spaced peripheral portions of said sealing member.

18. The method of claim 17, and wherein said central core is a metallic core.

* * * * *